United States Patent [19]

Ryan et al.

[11] 4,085,378
[45] Apr. 18, 1978

[54] QPSK DEMODULATOR

[75] Inventors: Carl R. Ryan, Hancock, Minn.; James H. Stilwell, Scottsdale, Ariz.

[73] Assignee: Motorola, Inc., Schaumburg, Ill.

[21] Appl. No.: 745,143

[22] Filed: Nov. 26, 1976

Related U.S. Application Data

[63] Continuation of Ser. No. 586,108, Jun. 11, 1975, abandoned.

[51] Int. Cl.² ............................................. H03D 3/02
[52] U.S. Cl. .................................. 329/124; 325/472; 329/133; 331/12
[58] Field of Search ............... 329/104, 124, 132, 133; 179/15 AN; 178/55–57; 331/12; 325/420, 472; 328/162, 163

[56] References Cited

U.S. PATENT DOCUMENTS

| | | | |
|---|---|---|---|
| 2,843,662 | 7/1958 | Rieke | 328/163 |
| 3,486,120 | 12/1969 | Doesschate, Jr. | 325/472 |
| 3,566,285 | 2/1971 | Schroeder | 328/162 |
| 3,568,067 | 3/1971 | Williford | 325/320 |
| 3,748,590 | 7/1973 | Gray | 331/12 |
| 3,810,018 | 5/1974 | Stover | 329/136 |
| 3,947,636 | 3/1976 | Edgar | 328/163 |
| 3,952,260 | 4/1976 | Prochazka | 328/162 |

Primary Examiner—John Kominski
Attorney, Agent, or Firm—Eugene A. Parsons

[57] ABSTRACT

An improved quadraphase shift keyed (QPSK) adaptive demodulator includes a Costas loop modified to independently cross couple the inphase (I) and quadraphase ($\phi$) channels so that minimum cross talk takes place between the I and Q channels. Advantageously, the improved QPSK adaptive demodulator separates the feedback control for correcting the phasor errors in the I and Q phasors. Advantageously, the improved demodulator permits independent phase adjustment of the I and Q demodulator outputs.

2 Claims, 8 Drawing Figures

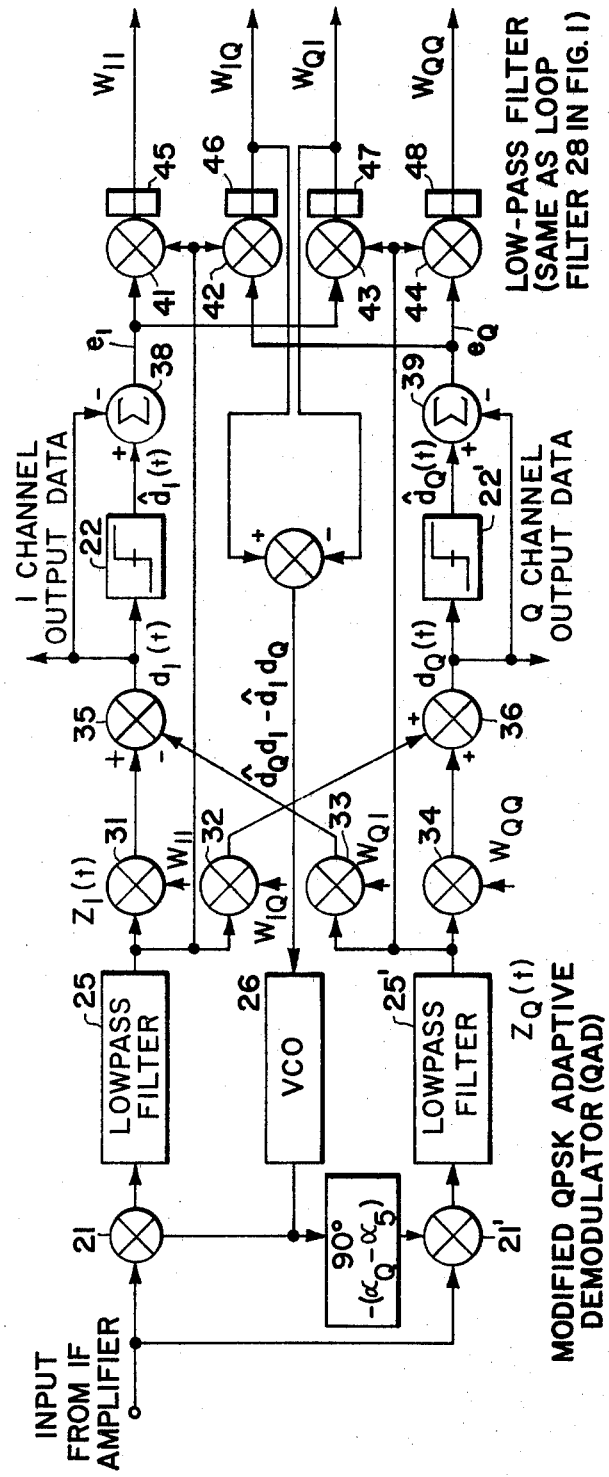
FIG. 2 MODIFIED QPSK ADAPTIVE DEMODULATOR (QAD)
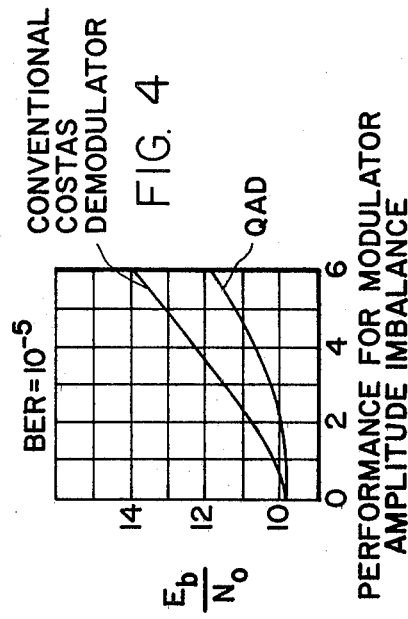
FIG. 4
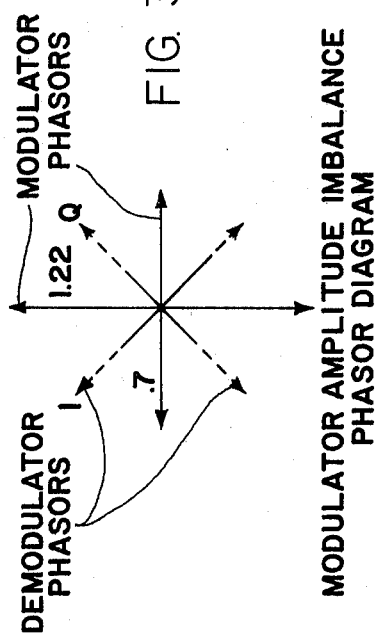
FIG. 3 MODULATOR AMPLITUDE IMBALANCE PHASOR DIAGRAM

DEMODULATOR STATIC PHASE
ERROR (∅) PHASOR DIAGRAM

PERFORMANCE FOR
DEMODULATOR STATIC
PHASE ERROR (∅)

DEMODULATOR QUADRATURE
ERROR (∅) PHASOR DIAGRAM

PERFORMANCE FOR
DEMODULATOR
QUADRATURE ERROR

QPSK DEMODULATOR

This is a continuation of application Ser. No. 586,108, filed June 11, 1975, and now abandoned.

BACKGROUND OF THE INVENTION

1. Field of the Invention

This invention relates to a demodulator and more particularly, an improved quadraphase shift keyed adaptive demodulator.

2. Prior Art

To meet the increasing demand for ultra high speed data transmission, in recent years, quadraphase shift keyed transmission systems are commonly used to take advantage of its capability for handling higher rates of data transmission. In quadraphase shift keyed data transmission systems, usually several different techniques have been utilized to demodulate the quadraphase shift keyed signal. Of the several techniques, the so-called Costas demodulation is one of the more popular approaches. The Costas demodulation approach entails use of an error signal derived from the inphase and quadraphase channels as follows. The output of the tracking VCO (voltage control oscillator) of the demodulator is split into quadrature components by a 90° hydrid phase splitter. The quadrature components are then supplied to the two phase detectors for the I and Q channels, respectively. The respective phase detector of the two channels demodulates the incoming digital signals. The demodulation also entails cross multiplication of the I and Q channels to obtain the cross talk between channels. The measure of the cross talk results in an error signal that drives the reference VCO. When the channel cross talk is minimized, the frequency and phase of the reference VCO are assumed to be correct for proper coherent demodulation.

The Costas approach suffers from a number of shortcomings one of which one is its inability to handle the modulator and demodulator phasor errors in a satisfactory manner and the other is that the conventional Costas approach requires the phase locking of the demodulator.

SUMMARY OF THE INVENTION

It is an object of the present invention to provide an improved quadraphase shift keyed transmission system.

It is another object of the present invention to provide an improved quadraphase shift keyed demodulator.

It is a still a further object of the present invention to provide an improved means for correcting the phasor errors in the quadraphase shift keyed transmission system.

The foregoing and other objects are achieved in accordance with the present invention by providing an improved quadraphase shift keyed adaptive demodulator which includes a modified Costas loop so configured as to cross couple the inphase and quadrature phase channels in which a minimum cross talk takes place between the two channels and in effect independently demodulating the two channels.

According to another feature of the invention, the phase of the I and Q demodulator outputs are independently adjusted.

Advantageously, the improved adaptive demodulator enhances the quadraphase shift keyed transmission system by reducing the modulator and demodulator phasor degradations. This permits less modulation and demodulation phase balance and requires no phase locking of the demodulator. This allows the use of a first order phase lock loop resulting in improved locking characteristics. Also, advantageously the locking indication can be readily detected by linearly summing the two demodulated signals.

The foregoing and various other features and advantages of the present invention will become clearer from the following detailed description of an illustrative embodiment of the present invention in conjunction with the accompanying drawings.

BRIEF DESCRIPTION OF THE DRAWINGS

FIG. 2 shows a modified QPSK demodulator in accordance with the present invention.

FIG. 3 shows a modulator amplitude imbalance phasor diagram.

FIG. 4 shows performance for modulator amplitude imbalance.

FIG. 1 shows a QPSK demodulator 11 and a data estimation loop 12 used in a conventional transmission system. The QPSK demodulator 11 and data estimation IQ loop 12, more commonly known as a Costas data estimation loop, are used in a conventional design, for obtaining the demodulated I and Q channel baseband outputs as illustrated in FIG. 1. The Costas loop technique is used to obtain a control signal from the detected I and Q channel baseband signals at the outputs of the respective low pass filters 25 and 25'.

Figure 1:
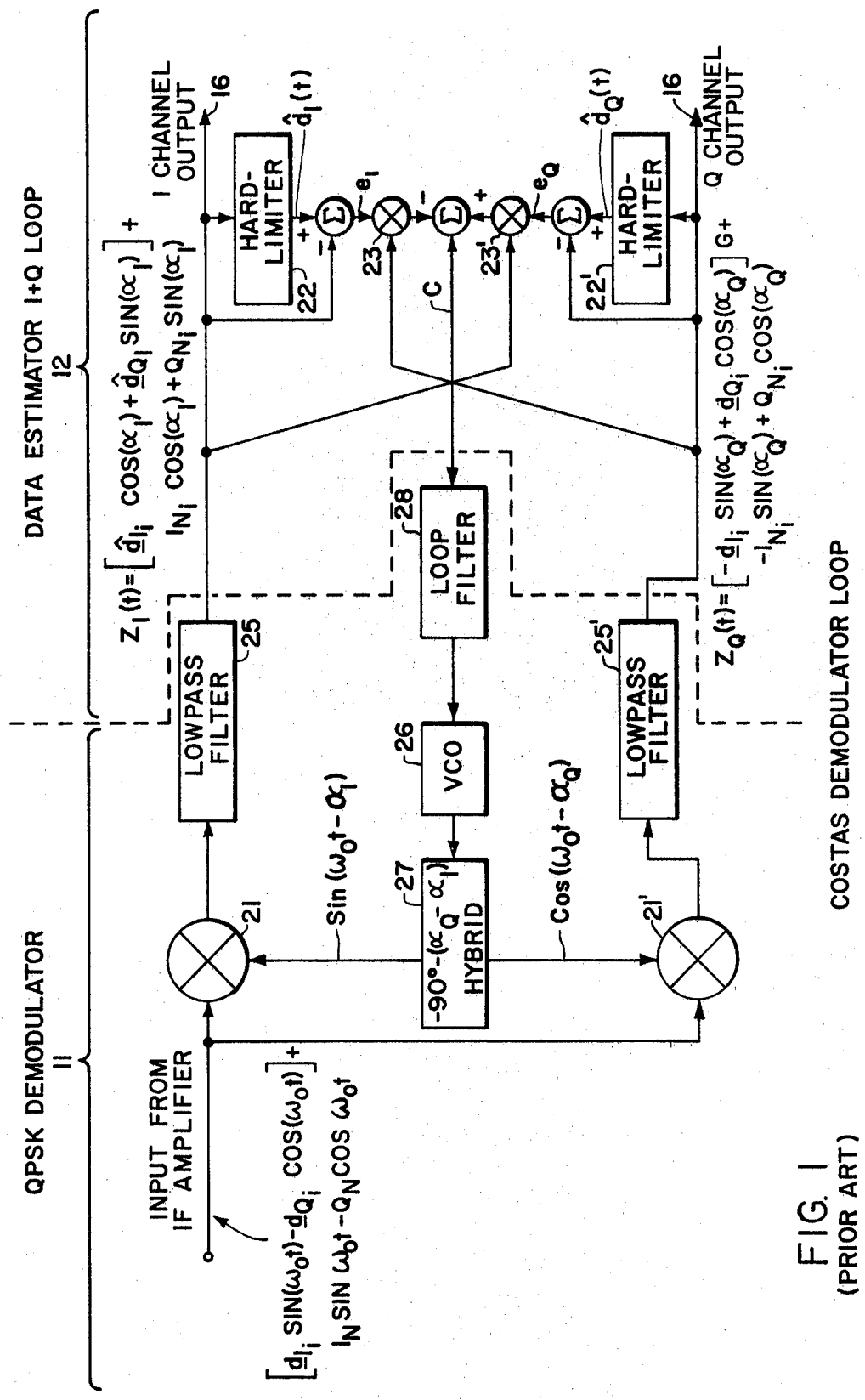
FIG. 1 shows a conventional Costas demodulation loop used in a quadraphase transmission system.

Referring to the operation, the QPSK demodulator-data estimation loop circuitry receives an incoming signal which can be represented by:

$$\hat{d}_{I_i}\text{SIN}(\omega_o t) - \hat{d}_{Q_i}\text{COS}(\omega_o t) + I_N \text{SIN } \omega_o t - Q_N \text{COS } \omega_o t,$$

wherein the input from the IF amplifier, $\underline{d}_I$ and $\underline{d}_Q$ represent the transmitted I and Q channel data. $\omega_O$ represents the carrier frequency on which the QPSK signal spectrum is transposed. $t$ is the function time. $I_N$ and $Q_N$ represents the quadrature additive noise components which are introduced by the transmission channel.

The phase error between the hybrid phase splitter 27 outputs, SIN $(\omega_O t - \alpha_I)$ and COS $(\omega_O t - \alpha_Q)$, and the input from the IF amplifier are represented by $\alpha_I$ for the I channel and $\alpha_Q$ for the Q channel as detected by the phase detectors 21 and 21' respectively.

The phase detector outputs 21 and 21' multiply the input from the IF amplifier and the hybrid 27 outputs. The detector 21 and 21' outputs are then low-pass filtered to filter out the $2\omega_O$ (double frequency) components and leave the baseband outputs $Z_I(t)$ and $Z_Q(t)$ which may be expressed as follows:

$$Z_I(t) = \hat{d}_{I_i}\text{COS}(\alpha_I) + \hat{d}_{Q_i}\text{SIN}(\alpha_I) + I_{N_I}\text{COS}(\alpha_I) + Q_{N_I}\text{SIN}(\alpha_I) \quad \text{for the I channel}$$

-continued and $Z_Q(t) = -\hat{d}_{I_i}\text{SIN}(\alpha_Q) = \hat{d}_{Q_i}\text{COS}(\alpha_Q)$
$- I_{N_i}\text{SIN}(\alpha_Q) + Q_{N_i}\text{COS}(\alpha_Q)$ for the Q channel, as shown in FIG. 1, to the I and Q channel outputs of the conventional Costas, that is, data estimation loop 12.

As shown in FIG. 1, the control signal C for the demodulator VCO (voltage controlled oscillator) 26 is derived by taking the difference of the product of the I channel error $e_I$ and Q channel output $Z_Q$ and the product of the Q channel error $e_Q$ and the I channel output $Z_I$ and filtering it through a loop filter 28. The I channel error $e_I$ is defined as the difference between the I channel output $Z_I(t)$ and the hard limited data estimate of the I channel output $\hat{d}_I$. Similarly, the Q channel error $e_Q$ is defined as the difference between the Q channel output $Z_Q(t)$ and the hardlimited data estimate of the Q channel output $\hat{d}_Q$. The control signal C is low pass filtered through the loop filter 28 and used to control the VCO phase.

The reference oscillation from the tracking VCO 26 is split into quadrature components by the 90° hybrid phase splitter 27. The two components are fed to the two phase detectors 21 and 21' for the I and Q channels, respectively. The respective phase detector outputs are processed through the two low pass filters 25 and 25' which remove the double frequency signal components and leaves the two quadrature Zbaseband demodulated data channels for use by output utilization means (not shown) at the output terminals 16 and 16'. These signals are hard limited in limiters 22 and 22' to provide estimated data outputs $\hat{d}_I(t)$ and $\hat{d}_Q(t)$ of the actual transmitted data $\hat{d}_I(t)$ and $\hat{d}_Q(t)$ to represent the reference signals for the coherent detectors (multipliers) 23 and 23'.

These detectors 23 and 23' provide cross multiplication of I and Q channels to obtain a measure of cross talk between the quadrature channels. The measure of the crosstalk is the error signal C that controls the reference VCO 26 via the loop filter 28.

It is found that the Costas loop is not capable of handling the crosstalk introduced by the modulator and demodulator phasor errors ($\alpha_I$ and $\alpha_Q$) in a satisfactory manner. This is because the Costas loop assumes that the I and Q channel data are in quadrature and have been subjected to identical types of distortions whereas, in fact, often the I and Q channels are subjected to dissimilar degrees of phasor distortions. Consequently, it has been found that $\alpha_I$ and $\alpha_Q$ are not in general identical.

It is found that phasor distortions can result from the modulated signal phasor errors. The modulation error can take place in power amplifiers where amplitude modulation is translated into phase modulation commonly known as AM/PM conversion. The modulator phasor errors are found to occur when the two orthogonal biphase modulated signals are of unequal amplitudes thus the resultant phase summation does not result in two quadrature signals. The phasor errors are also found to occur due to demodulator hardware errors, such as errors introduced by the hybrid phase splitter 27 when the two hybrid outputs are not exactly 90° out of phase with each other.

In accordance with the present invention, the conventional Costas loop illustrated in FIG. 1 is modified so that the crosstalk is reduced between the I and Q channels by cross coupling the I and Q channels so as to adjust and minimize the I and Q channel crosstalk.

The improved or modified Costas loop is found to have no degradation due to demodulator quadrature or static phase errors. Moreover, the demodulator has improved performance over the conventional Costas demodulator loop in correcting the modulator phasor errors.

The improved Costas loop shall now be described by means of analysis and comparison of the conventional demodulator in the form of Costas loop shown in FIG. 1 and the present inventive adaptive demodulator shown in FIG. 2.

FIG. 1 shows the demodulator portion of the QPSK receiving system with the mathematical analysis indicated therein and as explained above. It shows the demodulated signal with phase errors $\alpha_I$ and $\alpha_Q$. A static phase error is present when $\alpha_I = \alpha_Q \neq 0$. A demodulator quadrature error is present when $\alpha_I \neq \alpha_Q$. In accordance with the present invention, the QPSK Adaptive Demodulator, or otherwise referred to as QAD, introduces additional circuitry to the demodulator of FIG. 1 as shown in FIG. 2 to remove the effects of $\alpha_I$ and $\alpha_Q$ phase errors.

The object of the modified demodulator structure shown in FIG. 2 is to minimize the crosstalk on the Q channel $Z_Q(t)$ and I channel $Z_I(t)$ outputs. The modified structure goes further than the conventional approach of FIG. 1 in the minimization process and achieves improved performance over the demodulator shown in FIG. 1 for many common QPSK phasor distortions by means of a modified structure as shown in FIG. 2. The structure is modified, as shown in FIG. 2, so as to adjust the demodulated outputs $Z_I(t)$ and $Z_Q(t)$ into modified outputs $d_I(t)$ and $d_Q(t)$ resulting in less cross talk on each channel output than is possible by the conventional structure of FIG. 1.

The multipliers 31 to 34 ($W_{II}$, $W_{IQ}$, $W_{QI}$, and $W_{QQ}$) are designed to act as variable gain amplifiers which control the inchannel and cross channel contribution to the resulting outputs $d_I(t)$ and $d_Q(t)$. The gain of these amplifiers result from the algorithm which minimizes the mean square of the errors which are defined as the difference (or error) between the adjusted outputs $d_I(t)$ and $d_Q(t)$ and the hardlimited data estimates $\hat{d}_I(t)$ and $\hat{d}_Q(t)$. This algorithm of minimizing the mean square errors reduces to the structure shown in FIG. 2 where the product (or correlation) of $e_I$ and $Z_I(t)$ by the multiplier 41 is low pass filtered (45) and used to control the gain of amplifier 31. Amplifier 31 can be thought of as a multiplier in which the low pass filtered signal from 45 ($W_{II}$) is multiplied by $Z_I(t)$. Thus, the output of amplifier 31 is an amplified signal produced by the amplifier 31 amplifying the input signal $Z_I(t)$ by the amplifier gain $W_{II}$. Similarly, the signals $e_Q$ and $Z_I(t)$ are multiplied by multiplier 42 and the output is filtered in low pass filter 46 and applied to the amplifier 32. Likewise $e_I$ and $Z_Q(t)$ are multiplied, filtered and applied to amplifier 33 via the multiplier 43 and low pass filter 47. Finally, $e_Q$ and $Z_Q(t)$ are multiplied by multiplier 44, low pass filtered by filter 48 and the resulting signal used to control amplifier 34.

The multiplier (31 through 34) adjustments $W_{II}$, $W_{IQ}$, $W_{QI}$, and $W_{QQ}$ are set by minimizing the channel errors $e_I$ and $e_Q$. The QAD in effect minimizes the mean square error (MSE) with respect to these parameters where the MSE is defined as:

$$E\ e^2 = E\ \{\hat{d}(t) - d(t)\}^2 \quad (1)$$

or $$E\ e_I^2 = \tfrac{1}{4} \sum_{i=1}^{4} \hat{d}_{I_i} - (W_{II}Z_{I_i} - W_{QI}Z_{q_i})^2 \quad (2a)$$

and $$E\ e_Q^2 = \tfrac{1}{4} \sum_{i=1}^{4} \hat{d}_{Q_i} - (W_{QQ}Z_{Q_i} - W_{IQ}^2\ Z_{I_i})^2 \quad (2b)$$

where $E[x]$ represents the expected value of $[x]$ and $i$ represents the four possible demodulator phasor states. $\hat{d}_{I_i}$ and $\hat{d}_{Q_i}$ represent the ith estimates of the orthogonal data $d_I(t)$ and $d_Q(t)$. In order to minimize the MSE's with respect to the multiplier adjustments $W_{II}$, $W_{IQ}$, $W_{QI}$ and $W_{QQ}$, the gradients ($\nabla$) of the MSE's are expressed as follows:

$$\tfrac{1}{2}\nabla W_{II} E\ e_I^2 = -\Sigma Z_{I_i}e_{I_i} = \Sigma Z_{I_i}\hat{d}_{I_i} + W_{II}\Sigma Z_{I_i}^2 - W_{QI}\Sigma Z_{I_i}Z_{Q_i} \quad (3a)$$

$$\tfrac{1}{2}\nabla W_{QI} E\ e_I^2 = \Sigma Z_{Q_i}e_{I_i} = Z_{Q_i}\hat{d}_{I_i} - W_{II}\Sigma Z_{I_i}Z_{Q_i} + W_{QI}\Sigma Z_{Q_i}^2 \quad (3b)$$

$$\tfrac{1}{2}\nabla W_{QQ} E\ e_Q^2 = -\Sigma Z_{Q_i}e_{Q_i} = -\Sigma Z_{Q_i}\hat{d}_{Q_i} + W_{QQ}\Sigma Z_{Q_i}^2 + W_{IQ}\Sigma Z_{I_i}Z_{Q_i} \quad (3c)$$

and $$\tfrac{1}{2}\nabla W_{IQ} E\ e_Q^2 = -\Sigma Z_{I_i}e_{Q_i} = -\Sigma Z_{I_i}\hat{d}_{Q_i} + W_{QQ}\Sigma Z_{I_i} Z_{Q_i} + W_{IQ}\Sigma Z_{I_i}^2 \quad (3d)$$

where $$\Sigma = \sum_{i=1}^{4}.$$

(3a) and (3b) can be solved for $W_{II}$ and $W_{QI}$ which gives a minimum MSE for $e_I$ independent of solving (3c) and (3d) for $W_{QQ}$ and $W_{IQ}$ to give a minimum MSE for $e_Q$.

Solving (3) for W, the algorithms for controlling the W coefficients, $W_{II}$, $W_{IQ}$, $W_{QI}$, $W_{QQ}$, are shown in FIG. 2. As indicated in (3a) and (3b), the error $e_I$ is minimized by minimizing the correlation between $Z_I$ and $e_I$ and simultaneously $Z_Q$ and $e_I$. In other words, when the correlation in the I channel error ($e_I$) is minimized with respect to the demodulator outputs $Z_I$ and $Z_Q$, then $d_I$ has been adjusted in the best manner possible to minimize the MSE.

In making these adjustments, $\hat{d}_I$ is made to very closely represent the hardlimited data estimates $\bar{d}_I$ which is an estimate of I channel transmitted data. Note that the above correlation between $Z_I$ and $e_I$ is derived by multiplying $Z_I$ times $e_I$ resulting in the correlation between $Z_I$ and $e_I$. When this product (between $Z_I$ and $e_I$) is low pass filtered, it represents an average of the correlation. This filtered correlation signal is represented in FIG. 2 as $W_{II}$ and is used to adjust the gain of amplifier 31. This gain adjustment of amplifier 31 thus minimizes the error of $d_I$ with respect to $\hat{d}_I$ due to the I channel demodulator output $Z_I$. In a similar manner the control signals $W_{IQ}$, $W_{QI}$, and $W_{QQ}$ are used to optimize $d_I$ and $d_Q$, the I and Q channel outputs, as defined in (3) and shown in FIG. 2.

Furthermore, the demodulator phase is controlled by minimizing the MSE, $E\ e^2$, with respect to the demodulator phase, $\alpha$, which is $\alpha_Q - \alpha_I$, which results in a demodulator VCO control signal proportional to:

$$\hat{d}_Q d_I - \hat{d}_I d_Q$$

The quadrature adaptive demodulator (QAD) does not actually require phase lock but only frequency lock. This is so because any demodulated static phase error results in I and Q channel cross talk which is removed by the amplifiers 32 and 33 of FIG. 2 by means of the gain control terms $W_{IQ}$ and $W_{QI}$ of FIG. 2.

ADAPTIVE DEMODULATOR PERFORMANCE

As the data rate increases, modulator and demodulator phasor errors are increasingly difficult to reduce to minor performance degradation levels in uncompensated QPSK links because of practical hardware limitations. The following sections illustrate the performance of conventional Costas demodulation loop and the present QAD receivers for representative modulator and demodulator phase error distortions.

In demonstrating the performance of the QPSK adaptive demodulator (QAD) as compared to the Costas loop, two types of distortions are considered; those resulting from modulator phasor errors and those resulting from demodulator phasor errors.

MODULATOR DISTORTIONS

A typically encountered distortion introduced by a QPSK modulator is that of amplitude distortion of the four possible QPSK phasors. In order to illustrate the effect of amplitude distortion on the performance of a conventional QPSK link and thus illustrate the improved performance derived by the QAD link the following example is given.

FIG. 3 shows the relationship of typically distorted conventional QPSK system modulator and demodulator phasors. In this example, the quadrature modulation phasors are of unequal amplitudes 0.7 and 1.2 thus implying a channel power imbalance of 4.8 dB. The solid lines in FIG. 3 representing the demodulation phasors is the reflection of the shorter modulation phasor of amplitude 0.7 being transmitted while the solid line plus the dotted line represents the reflection of the larger modulation phasor amplitude of 1.2. Therefore, the dotted lines represent the cross talk introduced in the demodulator outputs. This severe channel cross talk in conjunction with additive noise can severely degrade the data link performance over that of transmitting ideal modulation phasors. The performance degradation resulting from the modulation phasors of FIG. 3 would seem natural because two of the transmitted phasors have reduced power and thus dominate the system performance.

The performance of the two receivers is compared at a BER (Bit Error Rate) of $10^{-5}$ in FIG. 4. For 4.8 dB of modulator channel power imbalance, the QAD performance is degraded by 1.5 dB due to the loss of modulated signal power of one channel relative to the other channel. The QAD realizes 1.9 dB performance improvement over the conventional receiver for a modulator power imbalance of 4.8 dB as defined in FIG. 3.

The reason for the performance improvement of the QAD over the conventional QPSK demodulator is that the demodulator phasors of FIG. 3 are, in effect, reoriented through the use of amplifier 31 - 34 and summers 35 and 36 so that no cross talk results. This means that the I channel demodulator phasors are in effect rotated counterclockwise (as compared to the orientation of FIG. 3) until no cross talk results for any of the modulated phasors. Likewise, the Q channel demodulation phasors are in effect rotated clockwise to null out the Q channel cross talk. Note that the demodulator phasors are no longer in quadrature, which is not possible in the conventional QPSK demodulator, thus giving the QAD an advantage under many modulator as well as demodulator phasor distortions as illustrated next.

DEMODULATION DISTORTIONS

Demodulation quadrature phase offset and demodulator static phase error distortions are considered in this section. These demodulator phasor erros are very fundamental distortion sources present in wideband QPSK receivers.

Figure 5:
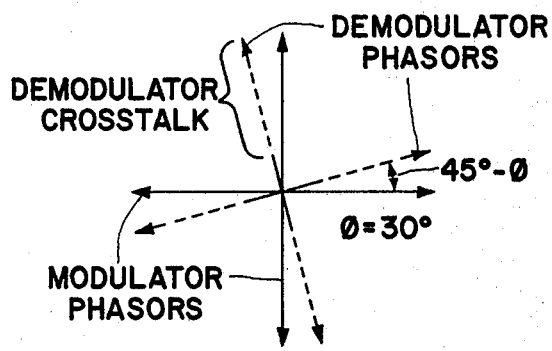
FIG. 5 shows a demodulator static error phasor diagram.

A demodulator static phase error is introduced to cause cross talk on the two orthogonal demodulator outputs. The conventional QPSK receiver performance is compared with the QAD receiver performance. FIG. 5 shows the additive noise-free demodulation phasors with respect to the orthogonal modulator phasors for a 30° demodulator static phase error. The severe cross talk introduced on the demodulator phasors is represented by the dotted lines. The noise at the demodulator outputs due to the additive noise input remains uncorrelated and constant in power no matter what static phase error is present. This is true becuase the demodulator phasors are orthogonal.

Figure 6:
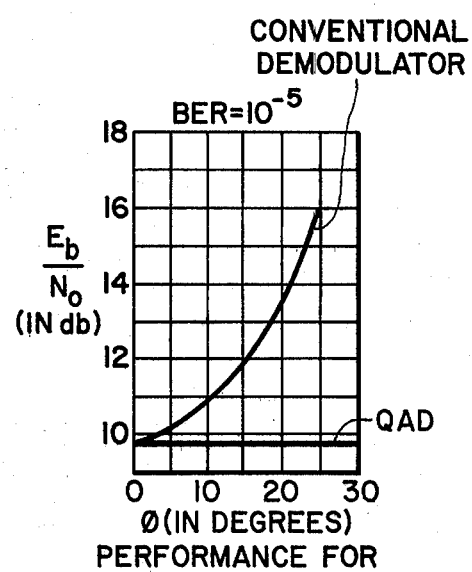
FIG. 6 shows performance for demodulator static phase.

FIG. 6 demonstrates the performance when distorted by the static phase error of FIG. 5 of the two receivers as a function of the $E_b/N_o$ (average received energy per bit per noise power density) versus demodulator static phase error at a constant BER of $10^{-5}$. Because of the channel cross talk shown in FIG. 5, the conventional Costas demodulator has a large performance degradation for phase errors in excess of 10 degrees. For instance, 3.7 dB degradation relative to $\phi = 0$ is introduced by a 20° static phase error. Note that the QAD experiences no detectable degradation due to demodulator static phase errors. This is true because any demodulator static phase error resulting in I and Q channel cross talk are removed by the cross terms amplifiers 32 and 33 shown in FIG. 2 which are associated with $W_{IQ}$ and $W_{QI}$.

Figure 7:
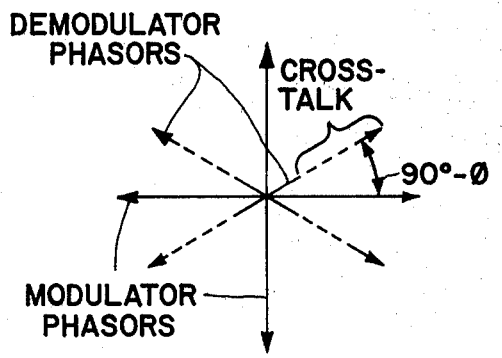
FIG. 7 shows a demodulator quadrature error ($\phi$) phasor diagram.

A second type of demodulator phasor error commonly referred to as quadrature phase error is illustrated in FIG. 7. The demodulation phasors are no longer orthogonal, due possible to an error in the 90° hybrid phase splitter 27 shown in FIGS. 1 and 2.

Figure 8:
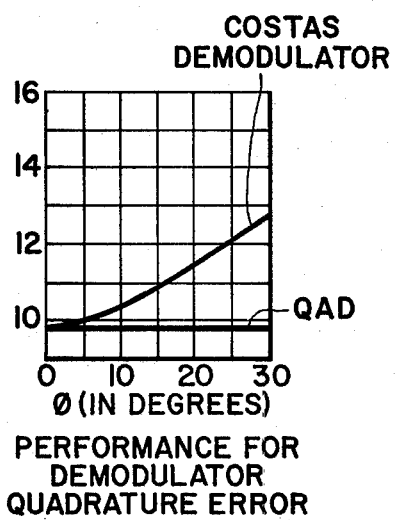
FIG. 8 shows performance for demodulator quadrature error ($\phi$).

FIG. 8 shows the performance of the Costas and QAD receivers as a function of $E_b/N_b$ versus demodulator quadrature error at a BER of $10^{-5}$. The modified equalizer experiences no detectable performance degradation; the reason for this is that the QAD can adjust the resulting I and Q channel phasor in relationship in other than a quadrature relationship by means of the cross talk term amplifiers 32 and 33 associated with $W_{IQ}$ and $W_{QI}$ of FIG. 2.

Various modifications and changes may be made by one skilled in the art without departing from the scope and spirit of the present invention.

What is claimed is:

1. In a QPSK demodulator wherein two modulated incoming quadrature separated signals are received at an input and demodulated into first and second signals, the improvement including:

first, second third and fourth variable amplifying means each having input, output and control terminals;

first and second summing means each having two inputs and an output;

the input terminals of said first and third amplifying means being connected to receive the first signal and the input terminals of said second and fourth amplifying means being connected to receive the second signal;

the inputs of said first summing means being connected to the output terminals of said first and fourth amplifying means, respectively, and the inputs of said second summing means being connected to the output terminals of said second and third amplifying means, respectively;

first and second data error estimating means connected to the output terminals of said first and second summing means, respectively;

first, second, third and fourth correlating means each having two inputs and an output;

one input of said first correlating means being connected to the first data error estimating means and the other input being connected to receive the first signal, one input of said second correlating means being connected to the second data error estimating means and the other input being connected to receive the second signal, one input of said third correlating means being connected to the second data error estimating means and the other input being connected to receive the first signal, and one input of said fourth correlating means being connected to the first data error estimating means and the other input being connected to receive the second signal;

the output terminals of said first, second, third and fourth correlating means being connected to the control terminals of said first, second, third and fourth amplifying means, respectively; and output means connected to said first and second data error estimating means providing first and second channel output data, respectively.

2. In a QPSK demodulator wherein two modulated incoming quadrature separated signals are received at an input and demodulated into in-phase and quadrature signals, the improvement including:

a first, second, third and fourth variable amplifying means each having input, output and control terminals;

first and second summing means each having two inputs and an output;

the input terminals of said first and third amplifying means being connected to receive the in-phase signal and the input terminals of said second and fourth amplifying means being connected to receive the quadrature signal;

the inputs of said first summing means being connected to the output terminals of said first and fourth amplifying means, respectively, and the inputs of said second summing means being connected to the output terminals of said second and third amplifying means, respectively;

the output terminals of said first and second summing means providing in-phase and quadrature channel output data, respectively;

in-phase and quadrature data error estimating means connected to the output terminals of said first and second summing means, respectively;

first, second, third and fourth correlating means each having two inputs and an output;

one input of said first correlating means being connected to the in-phase data error estimating means and the other input being connected to receive the in-phase signal, one input of said second correlating means being connected to the quadrature data error estimating means and the other input being connected to receive the quadrature signal, one input of said third correlating means being connected to the quadrature data error estimating means and the other input being connected to receive the in-phase signal, and one input of said fourth correlating means being connected to the in-phase data error estimating means and the other input being connected to receive the quadrature signal; and the output terminals of said first, second, third and fourth correlating means being connected to the control terminals of said first, second, third and fourth amplifying means, respectively, with the output terminals of said third and fourth correlating means also being combined and connected for controlling the demodulation of the incoming signals.

* * * * *